(12) United States Patent
Ito

(10) Patent No.: US 8,613,236 B2
(45) Date of Patent: Dec. 24, 2013

(54) SHIFT LEVER DEVICE

(75) Inventor: Hideaki Ito, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 324 days.

(21) Appl. No.: 13/008,573

(22) Filed: Jan. 18, 2011

(65) Prior Publication Data
US 2011/0174106 A1    Jul. 21, 2011

(30) Foreign Application Priority Data

Jan. 21, 2010 (JP) ................................ 2010-010807
Oct. 6, 2010 (JP) ................................ 2010-226364

(51) Int. Cl.
*B60K 20/00* (2006.01)
*F16H 59/04* (2006.01)

(52) U.S. Cl.
USPC .......................................... 74/473.3; 74/473.1

(58) Field of Classification Search
USPC ................ 74/473.1, 473.12, 473.2, 74/473.21–473.25, 473.3, 473.33
See application file for complete search history.

(56) References Cited

U.S. PATENT DOCUMENTS

| 6,756,698 | B2* | 6/2004 | Shamoto et al. ............. 307/10.6 |
| 2002/0056334 | A1* | 5/2002 | Fujinuma ..................... 74/473.1 |
| 2006/0016287 | A1* | 1/2006 | Grossman et al. .......... 74/473.21 |
| 2008/0006112 | A1* | 1/2008 | Mitteer ........................ 74/473.1 |
| 2008/0098846 | A1* | 5/2008 | Kitten et al. ................ 74/473.35 |
| 2008/0141807 | A1* | 6/2008 | Kimura et al. .................. 74/335 |
| 2011/0174106 | A1* | 7/2011 | Ito ................................ 74/473.3 |

FOREIGN PATENT DOCUMENTS

JP   2007-22375   2/2007

* cited by examiner

*Primary Examiner* — Troy Chambers
*Assistant Examiner* — Alexander Vu
(74) *Attorney, Agent, or Firm* — Roberts Mlotkowski Safran & Cole P.C.

(57) ABSTRACT

In a shift lever device, even when a magnet is immovably installed, the shift lever device can shift a shift lever between blocking and allowing operation from a "P" shift position to an "R" shift position because a first link and a yoke plate are slidable, a second link is rotatable with respect to the first link, and the magnet switches between attraction and non-attraction with respect to the yoke plate. For this reason, the magnet can be immovably installed.

5 Claims, 12 Drawing Sheets

SHIFT LEVER DEVICE

CROSS-REFERENCE TO RELATED APPLICATION

This application claims priority under 35 USC 119 from Japanese Patent Applications No. 2010-010807 filed on Jan. 21, 2010 and No. 2010-226364 filed on Oct. 6, 2010, the disclosures of which are incorporated by reference herein.

BACKGROUND

1. Technical Field

The present invention relates to a shift lever device whose shift position is changed as a result of a shift lever being operated.

2. Related Art

There is a shift lever device where an electromagnet holding member and an attraction plate holding member are rotatable with their centers of rotation being identical and where an electromagnet is held in the electromagnet holding member and an attraction plate is held in the attraction plate holding member (e.g., see Japanese Patent Application Laid-Open (JP-A) No. 2007-22375).

In this shift lever device, the electromagnet holding member and the attraction plate holding member are energized toward initial rotation position sides by an electromagnet energizing member and an attraction plate energizing member, respectively, the attraction plate holding member is stopped in its initial rotation position, and the electromagnet holding member is stopped in its initial rotation position as a result of the electromagnet contacting the attraction plate.

When a shift lever is operated from a "P" shift position, a rotational force is inputted from the shift lever to the electromagnet holding member, and the electromagnet holding member is rotated counter to the energizing force of the electromagnet energizing member.

In a state where the electromagnet does not produce a magnetic force and does not attract the attraction plate, the attraction plate holding member is not rotated even when the electromagnet holding member is rotated. Thus, the attraction plate holding member blocks operation of the shift lever, whereby operation of the shift lever from the "P" shift position is blocked.

Thereafter, when the shift lever is operated (returned) to the "P" shift position, the electromagnet holding member is rotated by the energizing force of the electromagnet energizing member and is returned to (stopped in) its initial rotation position as a result of the electromagnet making contact with the attraction plate.

On the other hand, in a state where the electromagnet produces a magnetic force and attracts the attraction plate, the attraction plate holding member is rotated counter to the energizing force of the attraction plate energizing member integrally with the rotation of the electromagnet holding member. Thus, the attraction plate holding member allows operation of the shift lever, whereby operation of the shift lever from the "P" shift position is allowed.

Further, after operation of the shift lever from the "P" shift position has been allowed, the electromagnet holding member and the attraction plate holding member are rotated by the energizing force of the electromagnet energizing member and the attraction plate energizing member, respectively, and are returned to (stopped in) their initial rotation position.

However, in this shift lever device, the electromagnet holding member that holds the electromagnet is rotatable as described above. For this reason, it is necessary to increase the energizing force of the electromagnet energizing member for causing the electromagnet holding member to return to its initial rotation position, and the stopping sound when the electromagnet holding member is returned to its initial rotation position (the sound of the electromagnet making contact with the attraction plate) increases.

Moreover, when the shift lever is operated at a high speed from the "P" shift position and a large rotational force is inputted from the shift lever to the electromagnet holding member, the inertial force of the electromagnet holding member increases because the electromagnet is held in the electromagnet holding member as described above. For this reason, even when the inertial force of the electromagnet holding member is large, it is necessary to increase the magnetic force produced by the electromagnet in order for the electromagnet to attract the attraction plate and cause the attraction plate holding member to rotate integrally with the electromagnet holding member (allow operation of the shift lever from the "P" shift position). Thus, the electromagnet grows in size, and the cost and mass of the electromagnet increase. Further, as a result of the mass of the electromagnet increasing, it is necessary to increase even more the energizing force of the electromagnet energizing member for causing the electromagnet holding member to return to its initial rotation position, and the stopping sound when the electromagnet holding member is returned to its initial rotation position (the sound of the electromagnet making contact with the attraction plate) increases even more.

Moreover, when the magnetic force produced by the electromagnet is increased as described above, the magnetic force remaining in the electromagnet immediately after the electromagnet has been switched from the state where it attracts the attraction plate to the state where it does not attract the attraction plate increases. For this reason, even when the shift lever is operated from the "P" shift position in a state where the magnetic force remaining in the electromagnet is large, it is necessary to increase the energizing force of the attraction plate energizing member that energizes the attraction plate holding member in order for the attraction plate holding member to not be rotated integrally with the electromagnet holding member (block operation of the shift lever from the "P" shift position). Thus, the stopping sound when the attraction plate holding member is returned to its initial rotation position becomes larger.

Further, even when the energizing force of the attraction plate energizing member that energizes the attraction plate holding member has been increased as described above, it is necessary to increase even more the magnetic force produced by the electromagnet in order for the electromagnet to attract the attraction plate and cause the attraction plate holding member to rotate integrally with the electromagnet holding member (allow operation of the shift lever from the "P" shift position). Thus, the electromagnet grows in size even more, and the cost and mass of the electromagnet increase even more. Further, as a result of the mass of the electromagnet increasing even more, it is necessary to further increase even more the energizing force of the electromagnet energizing member for causing the electromagnet holding member to return to its initial rotation position, and the stopping sound when the electromagnet holding member is returned to its initial rotation position (the sound of the electromagnet making contact with the attraction plate) further increases even more.

SUMMARY

In view of the circumstances described above, the present invention provides a shift lever device in which an attraction unit or a switch unit can be immovably installed.

A shift lever device of a first aspect of the present invention includes: a shift lever whose shift position is changed as a result of the shift lever being operated; a placement member that is movable between a blocking position and an allowing position and that is placed in the blocking position or the allowing position when the shift lever is operated from a predetermined shift position; a moving member that is movable with respect to the placement member, that blocks operation of the shift lever from the predetermined shift position as a result of the placement member being placed in the blocking position when the shift lever is operated from the predetermined shift position, and that allows operation of the shift lever from the predetermined shift position as a result of the placement member being placed in the allowing position when the shift lever is operated from the predetermined shift position; and an attraction unit that is capable of attracting the placement member, with the placement member being separable therefrom, and that switches the placement of the placement member in the blocking position and the allowing position when the shift lever is operated from the predetermined shift position, as a result of attraction and non-attraction with respect to the placement member being switched.

A shift lever device of a second aspect of the present invention includes: a shift lever whose shift position is changed as a result of the shift lever being operated; a moving member that is movable in a blocking direction and an allowing direction, that blocks operation of the shift lever from a predetermined shift position as a result of the moving member being moved in the blocking direction when the shift lever is operated from the predetermined shift position, and that allows operation of the shift lever from the predetermined shift position as a result of the moving member being moved in the allowing direction when the shift lever is operated from the predetermined shift position; and a switch unit that switches the direction in which the moving member is moved, when the shift lever is operated from the predetermined shift position, between the blocking direction and the allowing direction.

BRIEF DESCRIPTION OF THE DRAWINGS

Exemplary embodiments of the present invention will be described in detail based on the following figures, wherein.

DETAILED DESCRIPTION

First Embodiment

Figure 1:
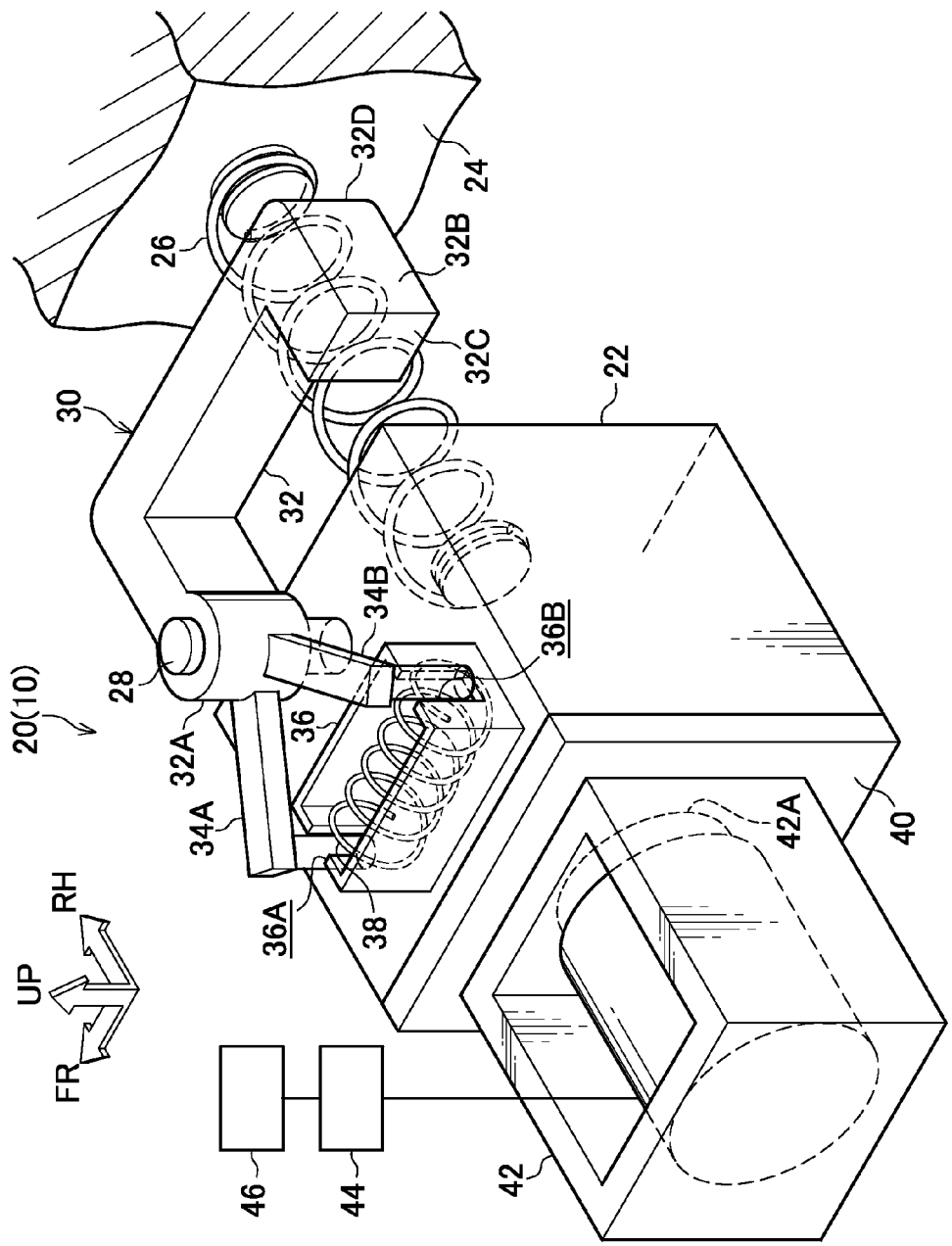
FIG. 1 is a perspective view showing a shift lock mechanism of a shift lever device pertaining to a first embodiment of the present invention as seen from the diagonal rear of a vehicle left side.
Figure 2:
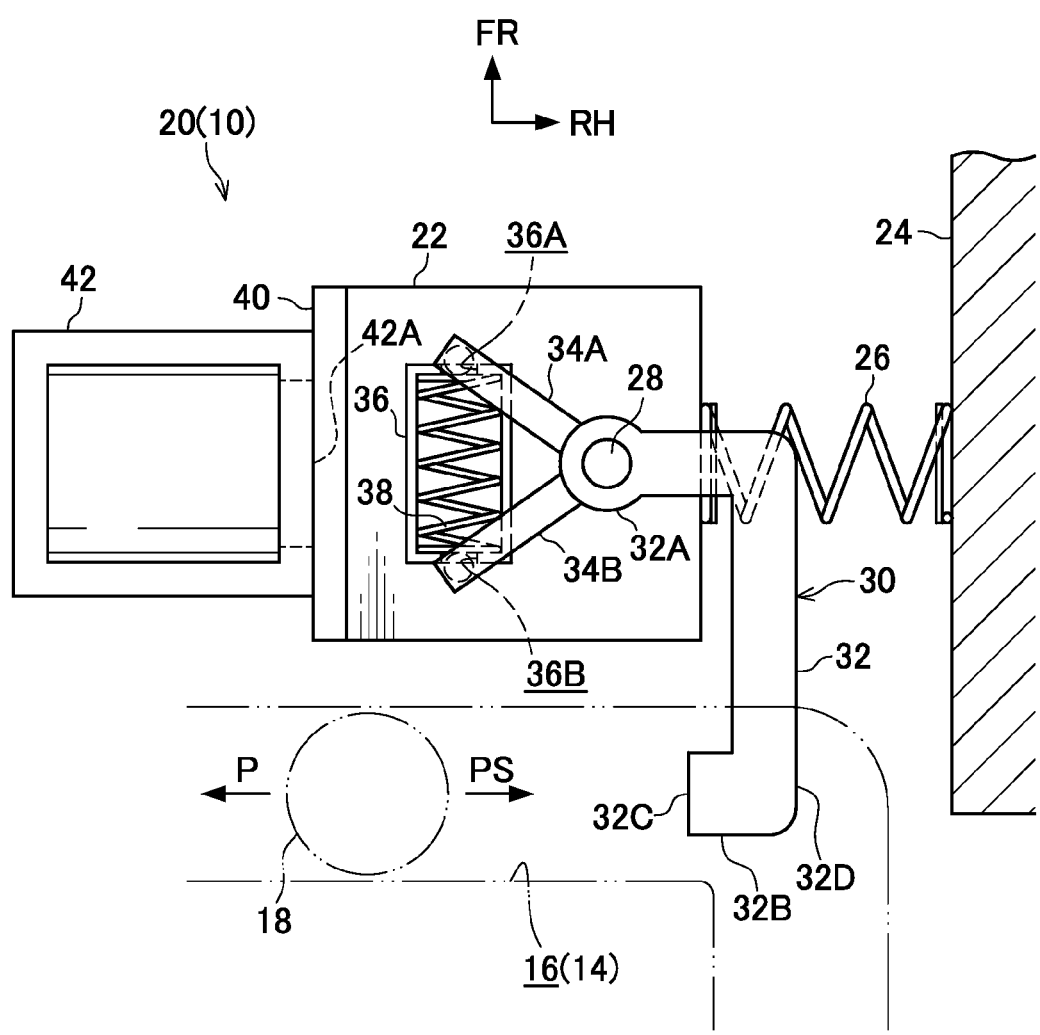
FIG. 2 is a plan view showing the shift lock mechanism of the shift lever device pertaining to the first embodiment of the present invention as seen from above.

In FIG. 1, main portions of a shift lever device 10 pertaining to a first embodiment of the present invention are shown in a perspective view as seen from the diagonal rear of a vehicle left side, and in FIG. 2, the main portions of the shift lever device 10 are shown in a plan view as seen from above. Moreover, in FIG. 5, the shift lever device 10 is shown in a plan view as seen from above. In the drawings, arrow FR represents a vehicle front direction, arrow RH represents a vehicle right direction, and arrow UP represents an up direction.

The shift lever device 10 pertaining to the present embodiment is a floor and gate shift lever device.

Figure 5:
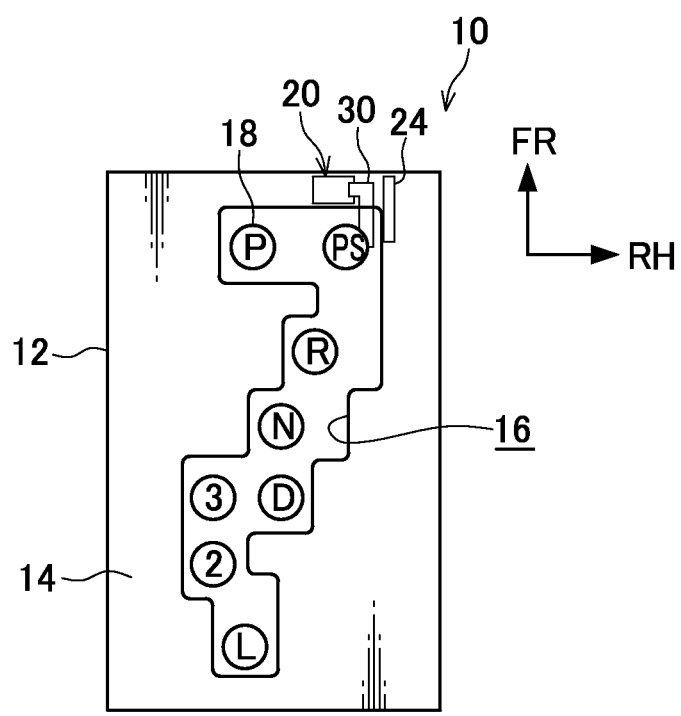
FIG. 5 is a plan view showing the shift lever device pertaining to the first embodiment of the present invention as seen from above.

As shown in FIG. 5, a housing 12 with a substantially rectangular box-like shape serving as an installation member is disposed in the shift lever device 10, and the housing 12 is installed in a vehicle front side portion and a vehicle left-right direction (vehicle width direction) center portion of a floor portion (floor) in a cabin of a vehicle. The upper wall of the housing 12 is configured by a plate-like cover 14, and an operation groove 16 with a predetermined bent shape serving as an operation path is formed through the cover 14.

A shift lever 18 with a substantially elongated circular rod-like shape serving as a pressing member is disposed in the shift lever device 10. The shift lever 18 is supported at its lower end on the lower end of the inside of the housing 12, and the shift lever 18 is operable (rotatable) in the vehicle front-rear direction and in the vehicle left-right direction about its lower end.

The upper side portion of the shift lever 18 is passed through the operation groove 16 in the cover 14, and the shift lever 18 is operated along the operation groove 16, whereby the shift position is changeable to a "P" shift position serving as a predetermined shift position, an "R" shift position, an "N" shift position, a "D" shift position, a "3" shift position, a "2" shift position, and an "L" shift position. Further, when the shift lever 18 is operated from the "P" shift position to the "R" shift position, the shift lever 18 is operated in the vehicle right direction (one direction in the vehicle width direction) such that it reaches a "PS" position and is thereafter operated in the vehicle rear direction and the vehicle left direction (the other direction in the vehicle width direction) in this order.

A shift lock mechanism 20 (shift lock unit) is fixed inside the housing 12, and the shift lock mechanism 20 is placed at the lower side and the vehicle front side of the "PS" position in the operation groove 16 in the cover 14.

Figure 3:
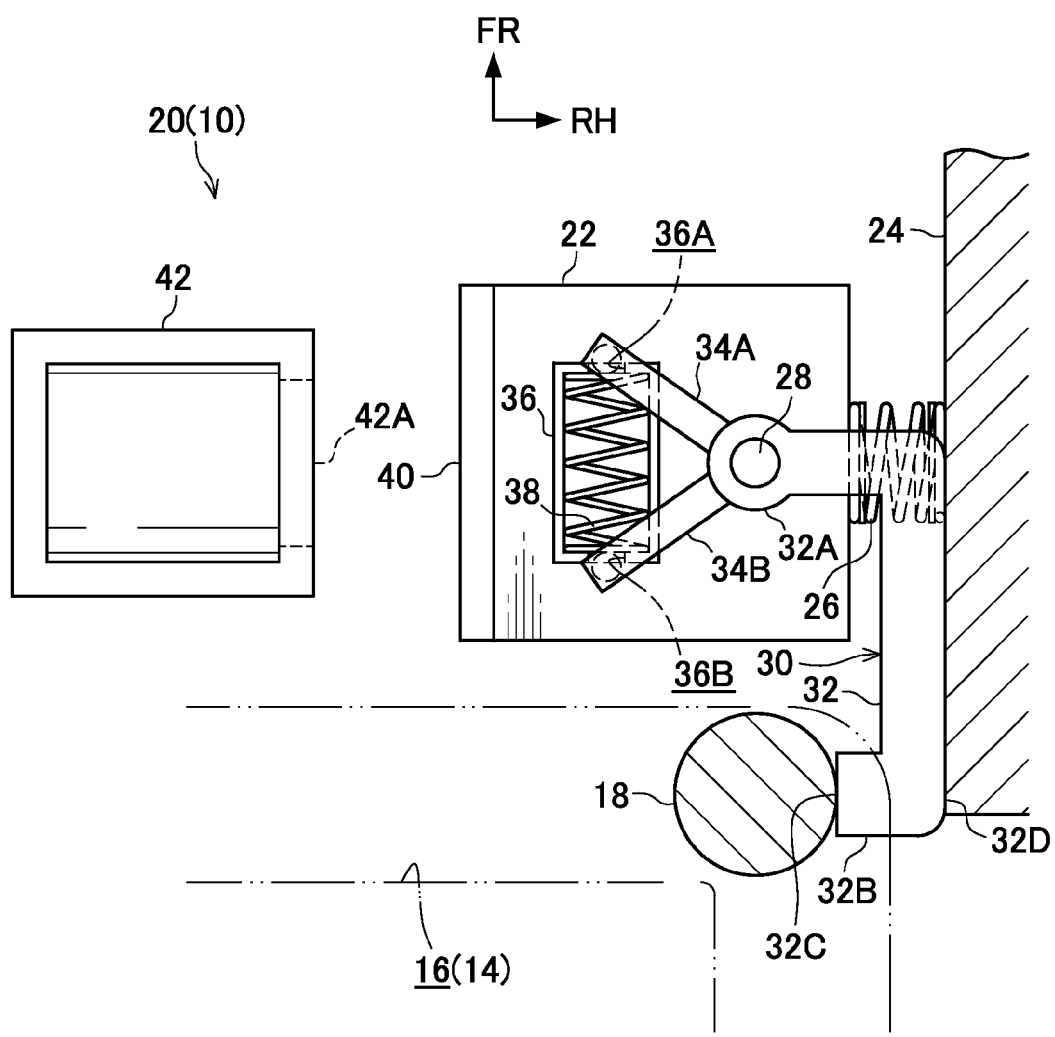
FIG. 3 is a plan view showing the shift lock mechanism of the shift lever device pertaining to the first embodiment of the present invention as seen from above at a time of shift lock.

As shown in FIG. 1 and FIG. 2, a first link 22 with a cuboid shape that configures a placement member is disposed in the shift lock mechanism 20, and the first link 22 is slidable in the vehicle left-right direction between an allowing position that is an initial position (a lock-release position in FIG. 1 and FIG. 2) and a blocking position (a lock position in FIG. 3).

A stop wall 24 serving as a stop member is fixed on the vehicle right side of the first link 22, and the vehicle left side surface of the stop wall 24 is placed perpendicular to the vehicle left-right direction. The stop wall 24 may be configured by part of a high-strength plate-like strength gate through which a gate groove is formed (including the peripheral edge of the gate groove), and the gate groove is formed in substantially the same shape as that of the operation groove 16 with the shift lever 18 being passed through the gate groove.

A first return spring 26 serving as a first energizing member is disposed bridging the distance between the first link 22 and the stop wall 24, and the first return spring 26 is configured by a compression coil spring and energizes the first link 22 in the vehicle left direction (the side opposite to the stop wall 24).

A support shaft 28 with a circular shaft-like shape is fixed on the first link 22, and the support shaft 28 is disposed projecting upward from the upper surface of the first link 22.

A second link 30 with a U-shaped rod-like shape serving as a moving member is supported on the support shaft 28. A link body 32 with a U-shaped rod-like shape is disposed in the second link 30, and the second link 30 is rotatably supported on the support shaft 28 at a proximal end portion 32A of the link body 32. A distal end portion 32B of the link body 32 is placed at the lower side of the "PS" position in the operation groove 16 in the cover 14.

The vehicle left side surface of the distal end portion 32B of the link body 32 is configured by a planar lock surface 32C serving as a blocking portion, and the lock surface 32C is placed perpendicular to the vehicle left-right direction. The vehicle right side surface of the distal end portion 32B of the link body 32 is configured by a pressing surface 32D serving as a pressing portion, and the pressing surface 32D is placed perpendicular to the vehicle left-right direction. At least one of the lock surface 32C and the pressing surface 32D may be slanted in the vehicle right direction or the vehicle left direction toward the vehicle front.

When the shift lever 18 is operated from the "P" shift position and reaches the "PS" position, the lock surface 32C of the second link 30 is pressed toward the vehicle right side by the shift lever 18. On the other hand, when the shift lever 18 is operated from the "R" shift position and reaches the "PS" position, the pressing surface 32D of the second link 30 is pressed toward the vehicle left side by the vehicle left side portion of the shift lever 18.

A pair of moving rods 34A and 34B with L-shaped rod-like shapes serving as moving portions are integrally disposed on the proximal end portion 32A of the link body 32. The proximal end portion of the moving rod 34A is disposed extending from the proximal end portion 32A of the link body 32 toward the vehicle front in the vehicle left direction, the proximal end portion of the moving rod 34B is disposed extending from the proximal end portion 32A of the link body 32 toward the vehicle rear in the vehicle left direction, and the distal end portions of the moving rods 34A and 34B are disposed extending downward.

A containment box 36 with a cuboid box-like shape is fixed on the upper surface of the first link 22, and the containment box 36 is made elongated in the vehicle front-rear direction. The upper surface of the containment box 36 is open, and rectangular open holes 36A and 36B are formed through the vehicle front side wall and the vehicle rear side wall of the containment box 36, respectively. The open holes 36A and 36B open upward, and the distal end portions of the moving rods 34A and 34B of the second link 30 are inserted into the open holes 36A and 36B, respectively. Further, rotation of the second link 30 is allowed as a result of the distal end portion of one of the moving rods 34A and 34B being moved inside the containment box 36 and the distal end portion of the other of the moving rods 34A and 34B being moved outside the containment box 36.

A second return spring 38 that configures a second energizing member is contained inside the containment box 36. The second return spring 38 is configured by a compression coil spring and is disposed bridging the distance between the vehicle front side wall and the vehicle rear side wall of the containment box 36. The second return spring 38 is also disposed bridging the distance between the distal end portions of the moving rods 34A and 34B of the second link 30; thus, rotation of the second link 30 is stopped (restricted) and the second link 30 is placed in an initial position. Further, the energizing force of the second return spring 38 is made large compared to the energizing force of the first return spring 26.

A yoke plate 40 with a rectangular plate-like shape serving as an attraction member that configures a placement member is held on the vehicle left side surface of the first link 22, and the yoke plate 40 is slidable integrally with the first link 22 and is made of metal (e.g., made of iron).

A magnet 42 serving as an attraction unit and a switch unit is fixed on the vehicle left side of the yoke plate 40, and an attraction surface 42A is disposed on the vehicle right side surface of the magnet 42. The yoke plate 40 is brought into surface-contact with the attraction surface 42A by the energizing force of the first return spring 26; thus, the first link 22 is stopped in the allowing position that is its initial position. Further, the yoke plate 40 is separable from the magnet 42 (the attraction surface 42A) as a result of the first link 22 and the yoke plate 40 being slid in the vehicle right direction counter to the energizing force of the first return spring 26.

The magnet 42 is electrically connected to a control device 44 of the vehicle. Brakes 46 of the vehicle are electrically connected to the control device 44, and the vehicle is braked as a result of the brakes 46 being operated.

In a state where the brakes 46 are not operated, an electric current is not passed through the magnet 42 by the control of the control device 44, whereby a magnetic force does not arise in the attraction surface 42A and the yoke plate 40 is not attracted to the attraction surface 42A. Thus, sliding of the yoke plate 40 and the first link 22 in the vehicle right direction (a blocking direction) is allowed, whereby the first link 22 is slidable from the allowing position to the blocking position and is placed in a blocking state (a lock state).

On the other hand, in a state where the brakes 46 have been operated, an electric current is passed through the magnet 42 by the control of the control device 44, whereby a magnetic force arises in the attraction surface 42A and the yoke plate 40 is attracted to (held on) the attraction surface 42A. Thus, sliding of the yoke plate 40 and the first link 22 in the vehicle right direction is blocked by the magnet 42, whereby the first link 22 is held in the allowing position and is placed in an allowing state (a lock-release state).

The energizing force of the second return spring 38 is made small compared to the combined total of the force of attraction of the magnet 42 (the attraction surface 42A) with respect to the yoke plate 40 and the energizing force of the first return spring 26. For this reason, in a state where the first link 22 is held in the allowing position by the magnet 42 as described above, the second link 30 is rotatable counter to the energizing force of the second return spring 38, and the lock surface 32C of the second link 30 is rotatable toward the vehicle right side and the vehicle front side (an allowing direction).

Next, the action of the present embodiment will be described.

In the shift lever device 10 with the configuration described above, when the shift lever 18 is operated from the "P" shift position and reaches the "PS" position, the lock surface 32C of the second link 30 is pressed toward the vehicle right side by the shift lever 18.

In a state where the brakes 46 are not operated, an electric current is not passed through the magnet 42 by the control of the control device 44, and the yoke plate 40 is not attracted to the attraction surface 42A of the magnet 42. Further, the energizing force of the second return spring 38 is made large compared to the energizing force of the first return spring 26.

For this reason, when the lock surface 32C of the second link 30 has been pressed toward the vehicle right side by the shift lever 18, as shown in FIG. 3, the first link 22, the yoke plate 40, and the second link 30 are slid in the vehicle right direction counter to the energizing force of the first return spring 26 in a state where rotation of the second link 30 counter to the energizing force of the second return spring 38 is blocked, whereby the first link 22 is placed in the blocking position and the second link 30 is stopped by (brought into surface-contact with) the stop wall 24. Thus, rotation of the second link 30 resulting from the pressing force of the shift lever 18 is stopped by the stop wall 24, and the lock surface 32C of the second link 30 is not rotated toward the vehicle right side and the vehicle front side, whereby operation of the shift lever 18 to the "PS" position is blocked by the lock surface 32C of the second link 30 and operation of the shift lever 18 from the "P" shift position to the "R" shift position is blocked (locked).

Thereafter, when the shift lever 18 is operated (returned) to the "P" shift position, the first link 22, the yoke plate 40, and the second link 30 are slid in the vehicle left direction by the energizing force of the first return spring 26 and are returned to (stopped in) their initial position as a result of the yoke plate 40 being brought into contact with the magnet 42 (the attraction surface 42A).

On the other hand, in a state where the brakes 46 have been operated, an electric current is passed through the magnet 42 by the control of the control device 44, and the yoke plate 40 is attracted to the attraction surface 42A of the magnet 42. Further, the energizing force of the second return spring 38 is made small compared to the combined total of the energizing force of the first return spring 26 and the force of attraction of the magnet 42 with respect to the yoke plate 40.

Figure 4:
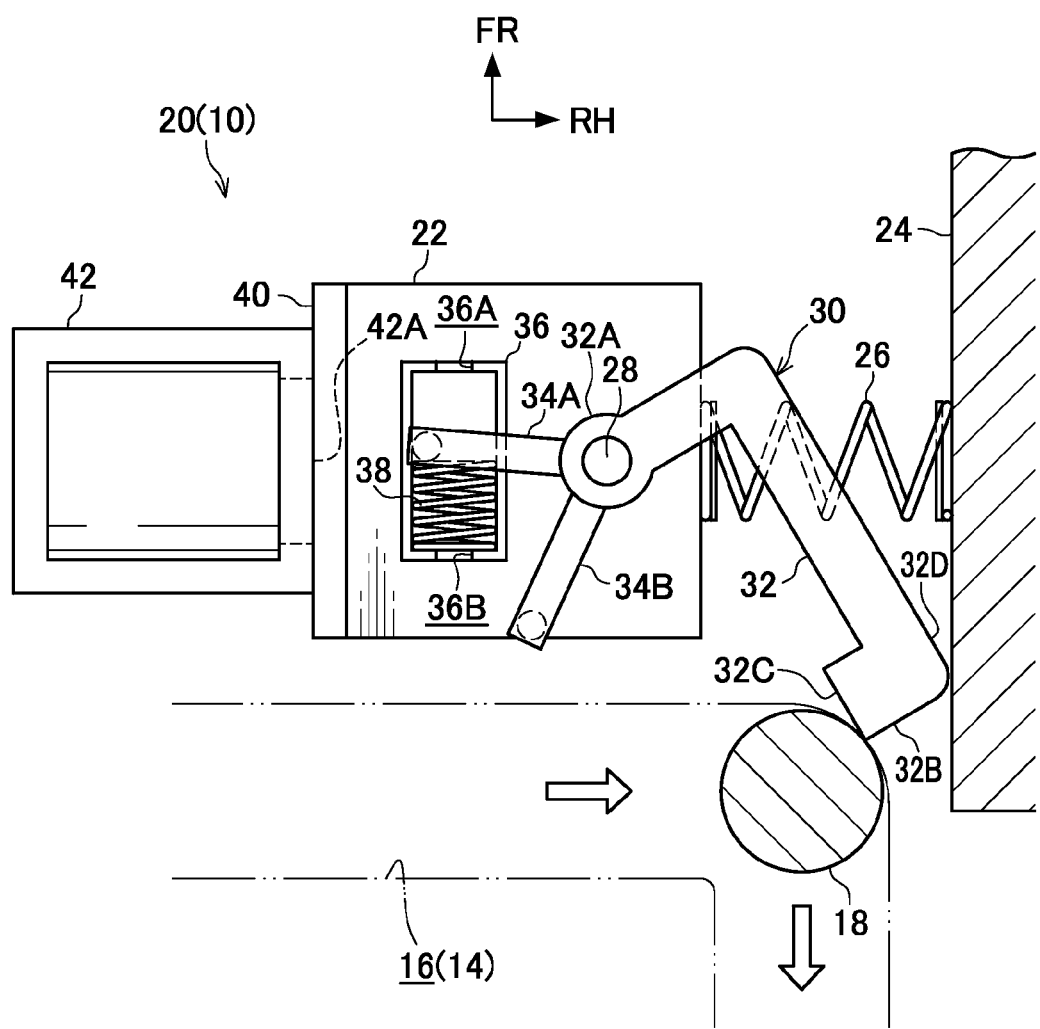
FIG. 4 is a plan view showing the shift lock mechanism of the shift lever device pertaining to the first embodiment of the present invention as seen from above at a time of shift lock release.

For this reason, when the lock surface 32C of the second link 30 has been pressed toward the vehicle right side by the shift lever 18, as shown in FIG. 4, the second link 30 is rotated counter to the energizing force of the second return spring 38 in a state where sliding of the first link 22, the yoke plate 40, and the second link 30 counter to the energizing force of the first return spring 26 and the force of attraction of the magnet 42 with respect to the yoke plate 40 is blocked. Thus, the lock surface 32C of the second link 30 is rotated toward the vehicle right side and the vehicle front side, whereby operation of the shift lever 18 to the "PS" position is allowed and operation of the shift lever 18 from the "P" shift position to the "R" shift position is allowed (unlocked).

Further, immediately after the shift lever 18 has passed the "PS" position, the second link 30 is rotated by the energizing force of the second return spring 38, whereby the second return spring 38 is brought into contact with the vehicle front side wall of the containment box 36 and the distal end portion of the moving rod 34B of the second link 30 is brought into contact with the second return spring 38, and thus the second link 30 is returned to (stopped in) its initial position.

When the shift lever 18 is operated from the "R" shift position and reaches the "PS" position, the pressing surface 32D of the second link 30 is pressed toward the vehicle left side by the vehicle left side portion of the shift lever 18, whereby the second link 30 is rotated counter to the energizing force of the second return spring 38. Thus, the distal end portion 32B of the second link 30 is rotated toward the vehicle left side and the vehicle front side, whereby operation of the shift lever 18 to the "PS" position is allowed and operation of the shift lever 18 from the "R" shift position to the "P" shift position is allowed.

Further, immediately after the shift lever 18 has passed the "PS" position, the second link 30 is rotated by the energizing force of the second return spring 38, whereby the second return spring 38 is brought into contact with the vehicle rear side wall of the containment box 36 and the distal end portion of the moving rod 34A of the second link 30 is brought into contact with the second return spring 38, and thus the second link 30 is returned to (stopped in) its initial position.

Here, even when the magnet 42 is immovably installed inside the housing 12, the shift lever device 10 can switch between blocking and allowing operation of the shift lever 18 from the "P" shift position to the "R" shift position because, as described above, the first link 22 and the yoke plate 40 are slidable, the second link 30 is rotatable with respect to the first link 22, and the magnet 42 switches between attraction and non-attraction with respect to the yoke plate 40.

Further, even when the magnet 42 is immovably installed inside the housing 12, the shift lever device 10 can switch between blocking and allowing operation of the shift lever 18 from the "P" shift position to the "R" shift position because, as described above, the second link 30 is movable in a sliding direction toward the vehicle right side and in the vehicle right direction and a rotating direction, and the vehicle front side and the magnet 42 (the attraction surface 42A) switches between attraction and non-attraction with respect to the yoke plate 40 to thereby switch the direction in which the second link 30 is moved.

As described above, the magnet 42 can be immovably installed inside the housing 12 like in the present embodiment.

Further, as described above, the magnet 42 is immovably installed inside the housing 12, and the magnet 42 is not held on the first link 22, the yoke plate 40, or the second link 30. For this reason, the energizing force of the first return spring 26 for causing the first link 22, the yoke plate 40, and the second link 30 to return to their initial position and the energizing force of the second return spring 38 for causing the second link 30 to return to its initial position can be reduced, and the stopping sound when the first link 22, the yoke plate 40, and the second link 30 are returned to their initial position (the sound of the yoke plate 40 being brought into contact with the magnet 42) and the stopping sound when the second link 30 is returned to its initial position (the sound of the second return spring 38 being brought into contact with the containment box 36 and the sound of the second link 30 (the moving rod 34A or the moving rod 34B) being brought into contact with the second return spring 38) can be reduced.

Moreover, even when the shift lever 18 is operated at a high speed from the "P" shift position to the "PS" position and a large sliding force (moving force) is inputted from the shift lever 18 to the first link 22, the yoke plate 40, and the second link 30, the inertial force of the first link 22, the yoke plate 40, and the second link 30 becomes smaller because, as described above, the magnet 42 is not held on the first link 22, the yoke plate 40, or the second link 30. For this reason, even when the magnetic force produced by the magnet 42 is reduced, the magnet 42 can attract the yoke plate 40 and allow the second link 30 to rotate counter to the energizing force of the second return spring 38 (operation of the shift lever 18 from the "P" shift position to the "R" shift position can be allowed). Thus, the magnetic force produced by the magnet 42 can be reduced, and the magnet 42 can be downsized, and the cost and mass of the magnet 42 can be reduced.

Moreover, because the magnetic force produced by the magnet 42 can be reduced as described above, the magnetic force remaining in the magnet 42 immediately after the magnet 42 has been switched from the state where it attracts the yoke plate 40 to the state where it does not attract the yoke plate 40 can be reduced. For this reason, even when the energizing force of the second return spring 38 that energizes the second link 30 is reduced, the first link 22, the yoke plate 40, and the second link 30 can be caused to slide in the vehicle right direction (operation of the shift lever 18 from the "P" shift position to the "R" shift position can be blocked) without causing the second link 30 to rotate when the shift lever 18 is operated from the "P" shift position toward the "PS" position immediately after the magnet 42 has been switched from the state where it attracts the yoke plate 40 to the state where it does not attract the yoke plate 40. Thus, the energizing force of the second return spring 38 can be reduced, and the stopping sound when the second link 30 is returned to its initial position (the sound of the second return spring 38 being brought into contact with the containment box 36 and the sound of the second link 30 (the moving rod 34A or the moving rod 34B) being brought into contact with the second return spring 38) can be reduced even more.

Further, because the energizing force of the second return spring 38 that energizes the second link 30 can be reduced as described above, even when the magnetic force produced by the magnet 42 is reduced even more, the magnet 42 can attract the yoke plate 40 and allow the second link 30 to rotate counter to the energizing force of the second return spring 38 (operation of the shift lever 18 from the "P" shift position to the "R" shift position can be allowed). Thus, the magnetic force produced by the magnet 42 can be reduced even more, the magnet 42 can be downsized even more, and the cost and mass of the magnet 42 can be reduced even more.

Moreover, because the magnet 42 is immovably installed inside the housing 12 as described above, the magnet 42 can be connected to the control device 44 by directly installing it on a circuit board, for example, and a cord connected to the magnet 42 can be rendered unnecessary. For this reason, automatic assembly by an assembling machine can easily be applied to the assembly of the shift lock mechanism 20.

Further, the first return spring 26 energizes the first link 22, the yoke plate 40, and the second link 30 to their initial position side, and the second return spring 38 energizes the second link 30 toward its initial position side. For this reason, the first link 22, the yoke plate 40, and the second link 30 can be returned to their initial position by a simple configuration.

Moreover, the second link 30 is movable in the sliding direction and the rotating direction. For this reason, the space in which the second link 30 is slid and the space in which the second link 30 is rotated can be overlapped to reduce the space in which the second link 30 is moved, and the shift lock mechanism 20—and therefore the shift lever device 10—can be downsized.

Second Embodiment

Figure 6:
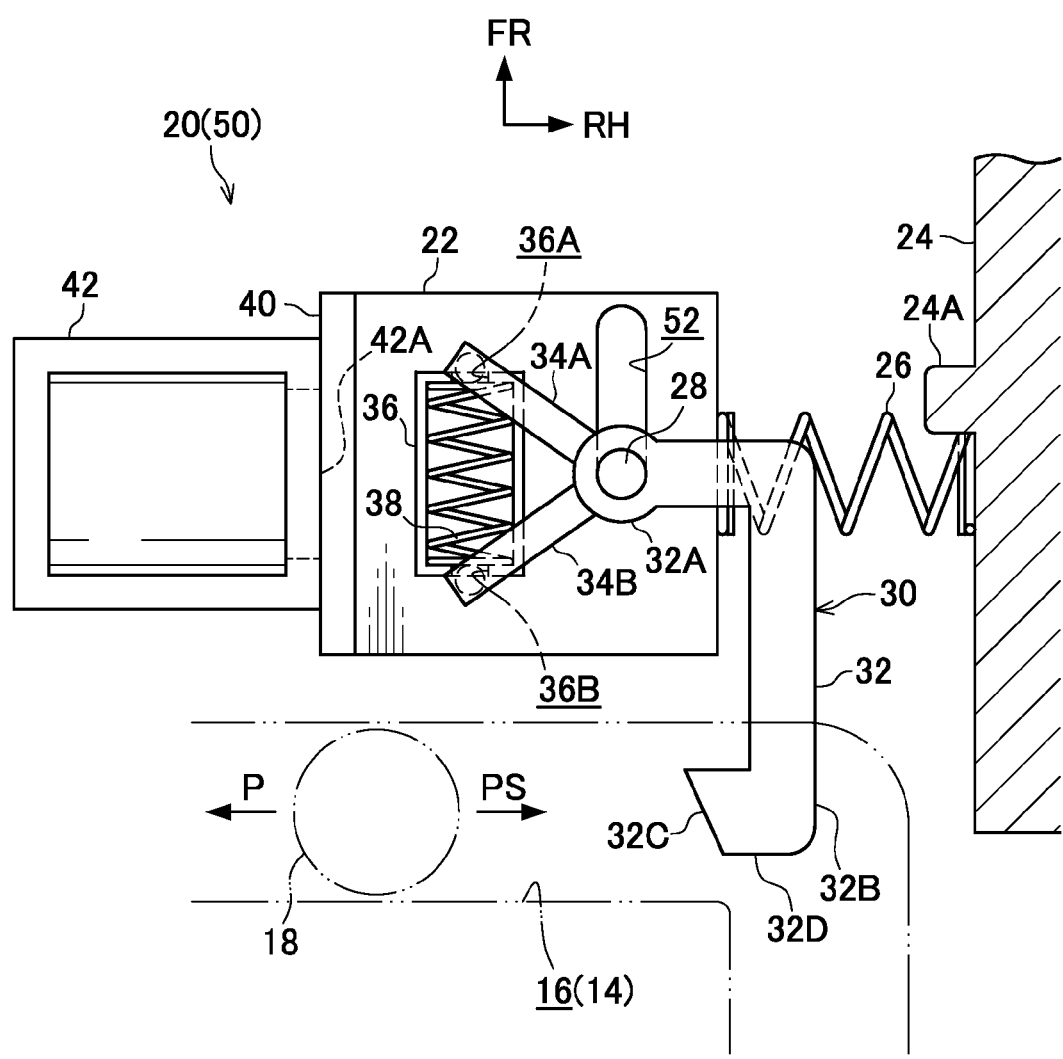
FIG. 6 is a plan view showing a shift lock mechanism of a shift lever device pertaining to a second embodiment of the present invention as seen from above.

In FIG. 6, main portions of a shift lever device 50 pertaining to a second embodiment of the present invention are shown in a plan view as seen from above.

The shift lever device 50 pertaining to the present embodiment has substantially the same configuration as that of the shift lever device 10 of the first embodiment but differs in the following respects.

As shown in FIG. 6, in the shift lever device 50 pertaining to the present embodiment, a link hole 52 that is elongated when seen in a plan view is formed at the first link 22, and the link hole 52 opens from the upper surface of the first link 22 and is placed parallel to the vehicle front-rear direction. The lower side portion of the support shaft 28 is inserted inside the vehicle rear side end portion of the link hole 52, and the support shaft 28 is non-rotatable and is slidable in the lengthwise direction of the link hole 52.

The second link 30 is non-rotatably supported on the support shaft 28, and the lock surface 32C of the second link 30 is slanted in the vehicle left direction toward the vehicle front. The pressing surface 32D of the second link 30 is configured by the vehicle rear side surface of the distal end portion 32B, and the pressing surface 32D is placed perpendicular to the vehicle front-rear direction. The pressing surface 32D may be slanted in the vehicle right direction or the vehicle left direction toward the vehicle front.

A stop projection 24A with a cuboid shape serving as a stop portion is integrally formed at the vehicle left side surface of the stop wall 24, and the stop projection 24A projects from the stop wall 24 toward the vehicle left side and is placed at the vehicle front side of the link body 32 of the second link 30.

Here, in a case where the magnet 42 does not produce a magnetic force and the yoke plate 40 is not attracted to the attraction surface 42A of the magnet 42 when the shift lever 18 is operated from the "P" shift position and reaches the "PS" position, the first link 22, the yoke plate 40, and the second link 30 are slid in the vehicle right direction counter to the energizing force of the first return spring 26 in a state where sliding of the second link 30 toward the vehicle front side counter to the energizing force of the second return spring 38 is blocked, whereby the first link 22 is placed in the blocking position and the link body 32 of the second link 30 is stopped by (brought into surface-contact with) the stop wall 24 and the stop projection 24A. Thus, sliding of the second link 30 toward the vehicle right side and the vehicle front side resulting from the pressing force of the shift lever 18 is stopped by the stop wall 24 and the stop projection 24A, and the lock surface 32C of the second link 30 is not slid toward the vehicle right side and the vehicle front side, whereby operation of the shift lever 18 to the "PS" position is blocked by the lock surface 32C of the second link 30 and operation of the shift lever 18 from the "P" shift position to the "R" shift position is blocked.

On the other hand, in a case where the magnet 42 produces a magnetic force and the yoke plate 40 is attracted to the attraction surface 42A of the magnet 42 when the shift lever 18 is operated from the "P" shift position and reaches the "PS" position, the support shaft 28 is slid toward the vehicle front side along the link hole 52 counter to the energizing force of the second return spring 38 in a state where sliding of the first link 22, the yoke plate 40, and the second link 30 in the vehicle right direction counter to the energizing force of the first return spring 26 and the force of attraction of the magnet 24 with respect to the yoke plate 40 is blocked, whereby the second link 30 is slid toward the vehicle front side counter to the energizing force of the second return spring 38. For this reason, the lock surface 32C of the second link 30 is slid toward the vehicle front side, whereby operation of the shift lever 18 from the "P" shift position to the "PS" position is allowed and operation of the shift lever 18 from the "P" shift position to the "R" shift position is allowed.

Further, immediately after the shift lever 18 has passed the "PS" position, the support shaft 28 is slid toward the vehicle rear side along the link hole 52 by the energizing force of the second return spring 38, and the second link 30 is slid toward the vehicle rear side by the energizing force of the second return spring 38. For this reason, the support shaft 28 is brought into contact with the vehicle rear side end portion of the link hole 52, the second return spring 38 is brought into contact with the vehicle rear side wall of the containment box 36, and the distal end portion of the moving rod 34A of the second link 30 is brought into contact with the second return spring 38, whereby the second link 30 is returned to (stopped in) its initial position.

Moreover, when the shift lever 18 is operated from the "R" shift position" and reaches the "PS" position, the pressing surface 32D of the second link 30 is pressed toward the vehicle front side by the shift lever 18, whereby the support shaft 28 is slid toward the vehicle front side along the link hole 52 counter to the energizing force of the second return spring 38 and the second link 30 is slid toward the vehicle front side counter to the energizing force of the second return spring 38. For this reason, operation of the shift lever 18 to the "PS" position is allowed and operation of the shift lever 18 from the "R" shift position to the "P" shift position is allowed.

Further, immediately after the shift lever 18 has passed the "PS" position, the support shaft 28 is slid toward the vehicle rear side along the link hole 52 by the energizing force of the second return spring 38, and the second link 30 is slid toward the vehicle rear side by the energizing force of the second return spring 38. For this reason, the support shaft 28 is brought into contact with the vehicle rear side end portion of the link hole 52, the second return spring 38 is brought into contact with the vehicle rear side wall of the containment box 36, and the distal end portion of the moving rod 34A of the second link 30 is brought into contact with the second return spring 38, whereby the second link 30 is returned to (stopped in) its initial position.

Thus, in the present embodiment also, the same action and effects as those of the first embodiment can be provided.

In the present embodiment, the shift lever device 50 has been given a configuration where the link hole 52 in the first link 22 is placed parallel to the vehicle front-rear direction, but it may also be given a configuration where the link hole 52 in the first link 22 is slanted in the vehicle right direction or the vehicle left direction toward the vehicle front. Further, when the shift lever device 50 is given a configuration where the link hole 52 in the first link 22 is slanted in the vehicle right direction toward the vehicle front, the lock surface 32C of the second link 30 may be placed perpendicular to the vehicle left-right direction or may be slanted in the vehicle right direction toward the vehicle front.

Third Embodiment

Figure 7:
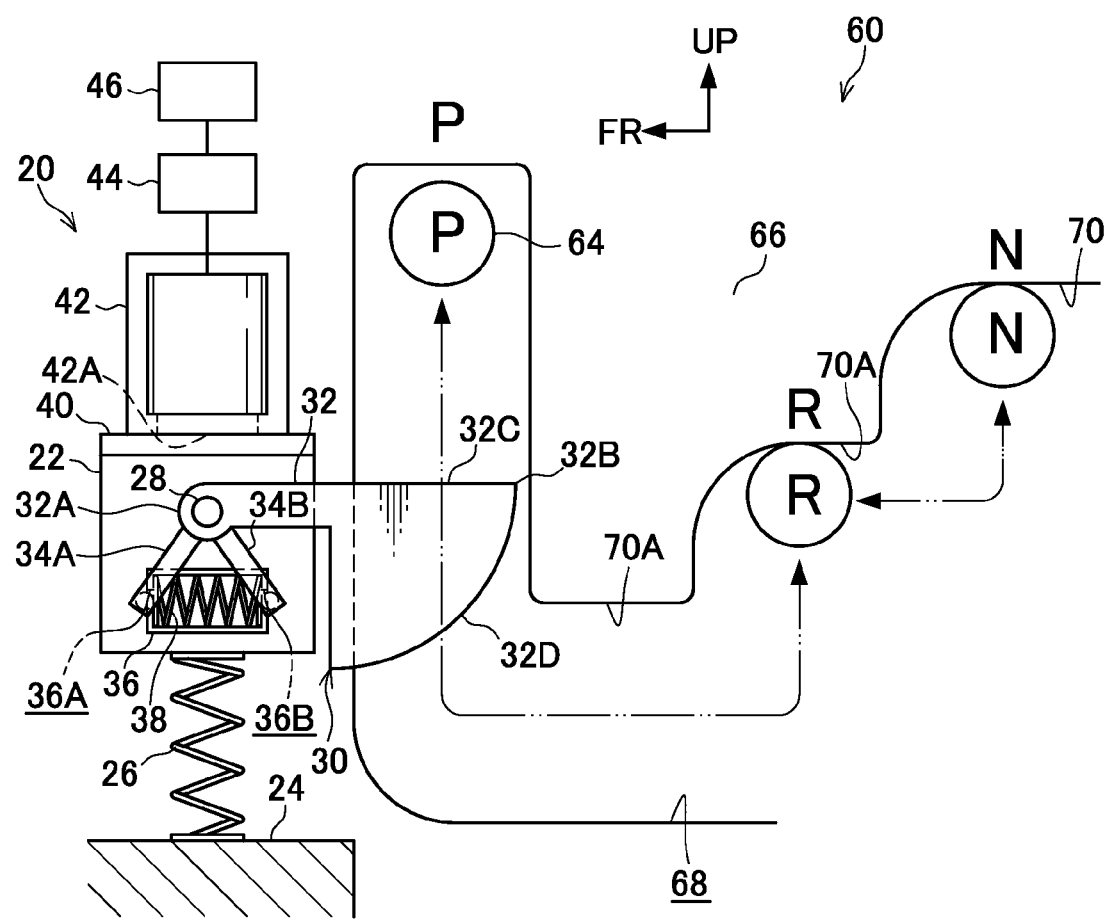
FIG. 7 is a side view showing a shift lock mechanism of a shift lever device pertaining to a third embodiment of the present invention as seen from the vehicle left side.
Figure 8:
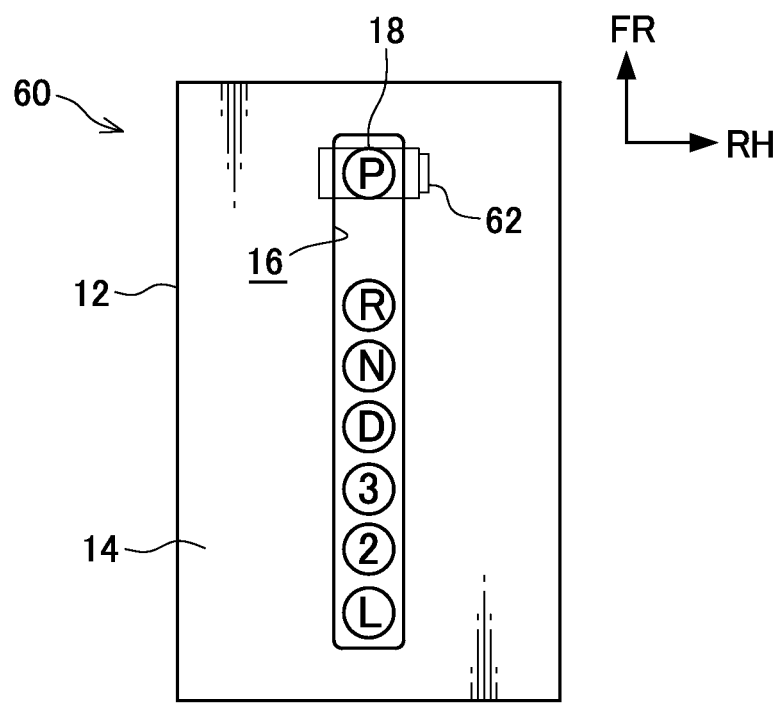
FIG. 8 is a plan view showing the shift lock mechanism of the shift lever device pertaining to the third embodiment of the present invention as seen from above.

In FIG. 7, main portions of a shift lever device 60 pertaining to a third embodiment of the present invention are shown in a side view as seen from the vehicle left direction, and in FIG. 8, the shift lever device 60 is shown in a plan view as seen from above.

The shift lever device 60 pertaining to the present embodiment has substantially the same configuration as that of the shift lever device 10 of the first embodiment but differs in the following respects.

As shown in FIG. 8, the shift lever device 60 pertaining to the present embodiment is a straight shift lever device, and the operation groove 16 in the cover 14 is placed parallel to the vehicle front-rear direction. For this reason, the shift lever 18 is operated in the vehicle front-rear direction along the operation groove 16, whereby the shift position is changeable to the "P" shift position, the "R" shift position, the "N" shift position, the "D" shift position, the "3" shift position, the "2" shift position, and the "L" shift position.

An operation button 62 serving as an operation portion is disposed on the upper end of the shift lever 18, and the operation button 62 is operable (pressable).

As shown in FIG. 7, a grooved pin 64 serving as a pressing member is disposed in the neighborhood of the lower end of the shift lever 18, and the grooved pin 64 is movable (rotatable) in the vehicle front-rear direction integrally with operation of the shift lever 18 in the vehicle front-rear direction.

Here, the grooved pin 64 is moved (slid) toward the lower side (one side) of the shift lever 18 as a result of the operation button 62 being operated (pressed). Further, the operation button 62 is returned to its initial position by an energizing force and the grooved pin 64 is moved toward the upper side (other side) of the shift lever 18 as a result of operation of the operation button 62 being released.

A detent plate 66 serving as an engagement member is fixed in the neighborhood of the grooved pin 64 inside the housing 12. A detent hole 68 serving as an engagement hole is formed through the detent plate 66, and the grooved pin 64 is inserted inside (passed through) the detent hole 68. A detent groove 70 with a concavo-convex shape serving as an engagement groove is formed at the upper edge (other side edge) of the detent hole 68; the detent groove 70 is formed at a concave shape in positions of the grooved pin 64 at each shift position of the shift lever 18, and detent peaks 70A (convex portions) serving as engagement portions are formed at positions of the grooved pin 64 between specific shift positions of the shift lever 18.

When the shift lever 18 is placed in the "P" shift position, the "R" shift position, the "N" shift position, the "D" shift position, the "3" shift position, the "2" shift position, and the "L" shift position, the grooved pin 64 is placed in a "P" position, an "R" position, an "N" position, a "D" position, a "3" position, a "2" position, and an "L" position, respectively, in the detent hole 68.

When the shift lever 18 is operated in a state where the operation button 62 is not operated and the grooved pin 64 is not moved toward the lower side of the shift lever 18, operation of the shift lever 18 is blocked in a case where the grooved pin 64 engages with the detent peaks 70A of the detent groove 70.

On the other hand, when the shift lever 18 is operated in a state where the operation button 62 has been operated and the grooved pin 64 has been moved toward the lower side of the shift lever 18, operation of the shift lever 18 is allowed because the grooved pin 64 does not engage with the detent peaks 70A of the detent groove 70.

Particularly in a case where the operation button 62 is not operated and the grooved pin 64 is not moved toward the lower side of the shift lever 18 when the shift lever 18 is operated from the "P" shift position to the "R" shift position and when the shift lever 18 is operated from the "R" shift position to the "P" shift position, operation of the shift lever 18 is blocked as a result of the grooved pin 64 engaging with the detent peak 70A between the "P" position and the "R" position" in the detent hole 68.

The shift lock mechanism 20 is placed at the vehicle front side of the detent hole 68, and the stop wall 24 and the magnet 42 of the shift lock mechanism 20 are placed at the lower side and the upper side, respectively.

The link body 32 of the second link 30 is formed in an L-shaped rod-like shape and is disposed extending from the support shaft 28 toward the vehicle rear side, and the distal end portion 32B of the link body 32 is placed at the lower side of the "P" position in the detent hole 68 on the side of the detent hole 68.

The lock surface 32C of the link body 32 is configured by the upper side surface of the distal end portion 32B, and the lock surface 32C is placed perpendicular to the up-down direction. The pressing surface 32D of the link body 32 is configured by the lower side surface of the distal end portion 32B, and the pressing surface 32D is slanted downward toward the vehicle front. The lock surface 32C may be slanted upward or downward toward the vehicle front. Further, the pressing surface 32D may be placed perpendicular to the up-down direction or may be slanted upward toward the vehicle front.

When the operation button 62 is operated and the grooved pin 64 is moved toward the lower side of the shift lever 18 in a state where the shift lever 18 has been placed in the "P" shift position, the lock surface 32C of the second link 30 is pressed toward the lower side by the grooved pin 64.

On the other hand, when operation of the operation button 62 is released and the grooved pin 64 is moved toward the upper side of the shift lever 18 after the shift lever 18 has been operated from the "R" shift position to the "P" shift position in a state where the operation button 62 has been operated and the grooved pin 64 has been moved toward the lower side of the shift lever 18, the pressing surface 32D of the second link 30 is pressed toward the upper side by the grooved pin 64.

The proximal end portion of the moving rod 34A of the second link 30 is disposed extending from the proximal end portion 32A of the link body 32 downward toward the vehicle front, the proximal end portion of the moving rod 34B of the second link 30 is disposed extending from the proximal end portion 32A of the link body 32 downward toward the vehicle rear, and the containment box 36 is placed at the lower side of the proximal end portion 32A of the link body 32.

Next, the action of the present embodiment will be described.

In the shift lever device 60 with the configuration described above, when the operation button 62 is operated and the grooved pin 64 is moved toward the lower side of the shift lever 18 in a state where the shift lever 18 has been placed in the "P" shift position, the lock surface 32C of the second link 30 is pressed toward the lower side by the grooved pin 64.

In a state where the brakes 46 are not operated, an electric current is not passed through the magnet 42 by the control of the control device 44, and the yoke plate 40 is not attracted to the attraction surface 42A of the magnet 42. Further, the energizing force of the second return spring 38 is made large compared to the energizing force of the first return spring 26.

For this reason, when the lock surface 32C of the second link 30 has been pressed toward the lower side by the grooved pin 64, the first link 22, the yoke plate 40, and the second link 30 are slid downward counter to the energizing force of the first return spring 26 in a state where rotation of the second link 30 counter to the energizing force of the second return spring 38 is blocked, whereby the first link 22 is placed in the blocking position and the lower end of the distal end portion 32B of the second link 30 is stopped by the stop wall 24. Thus, rotation of the second spring 30 resulting from the pressing force of the grooved pin 64 is stopped by the stop wall 24 and the lock surface 32C of the second link 30 is not rotated toward the lower side and the vehicle front side, whereby movement of the grooved pin 64 toward the lower side of the shift lever 18 (operation of the operation button 62) is blocked by the lock surface 32C of the second link 30. For this reason, the grooved pin 64 engages with the detent peak 70A between the "P" position and the "R" position in the detent hole 68, whereby operation of the shift lever 18 from the "P" shift position to the "R" shift position is blocked (locked).

Thereafter, when operation of the operation button 62 is released and the grooved pin 64 is moved toward the upper side of the shift lever 18, the first link 22, the yoke plate 40, and the second link 30 are slid upward by the energizing force of the first return spring 26 and are returned to (stopped in) their initial position as a result of the yoke plate 40 being brought into contact with the magnet 42 (the attraction surface 42A).

On the other hand, in a state where the brakes 46 have been operated, an electric current is passed through the magnet 42 by the control of the control device 44, and the yoke plate 40 is attracted to the attraction surface 42A of the magnet 42. Further, the energizing force of the second return spring 38 is made small compared to the combined total of the energizing force of the first return spring 26 and the force of attraction of the magnet 42 with respect to the yoke plate 40.

For this reason, when the lock surface 32C of the second link 30 has been pressed toward the lower side by the grooved pin 64, the second link 30 is rotated counter to the energizing force of the second return spring 38 in a state where sliding of the first link 22, the yoke plate 40, and the second link 30 downward counter to the energizing force of the first return spring 26 and the force of attraction of the magnet 42 with respect to the yoke plate 40 is blocked. Thus, the lock surface 32C of the second link 30 is rotated toward the lower side and the vehicle front side, whereby movement of the grooved pin 64 toward the lower side of the shift lever 18 (operation of the operation button 62) is allowed. For this reason, the grooved pin 64 does not engage with the detent peak 70A between the "P" position and the "R" position in the detent hole 68, whereby operation of the shift lever 18 from the "P" shift position to the "R" shift position is allowed (unlocked).

Further, immediately after the grooved pin 64 has been moved toward the lower side of the shift lever 18 and has crossed over the lock surface 32C of the second link 30, the second link 30 is rotated by the energizing force of the second return spring 38, whereby the second return spring 38 is brought into contact with the vehicle rear side wall of the containment box 36 and the distal end portion of the moving rod 34A of the second link 30 is brought into contact with the second return spring 38, and thus the second link 30 is returned to (stopped in) its initial position.

Moreover, when operation of the operation button 62 is released and the grooved pin 64 is moved toward the upper side of the shift lever 18 after the shift lever 18 has been operated from the "R" shift position to the "P" shift position in a state where the operation button 62 has been operated and the grooved pin 64 has been moved toward the lower side of the shift lever 18, the pressing surface 32D of the second link 30 is pressed toward the upper side by the grooved pin 64, whereby the second link 30 is rotated counter to the energizing force of the second return spring 38. For this reason, the distal end portion 32B of the second link 30 is rotated toward the upper side and the vehicle front side, whereby movement of the grooved pin 64 toward the upper side of the shift lever 18 is allowed and movement of the grooved pin 64 to the "P" position in the detent hole 68 is allowed.

Further, immediately after the grooved pin 64 has been moved toward the upper side of the shift lever 18 and has crossed over the distal end portion 32B of the second link 30, the second link 30 is rotated by the energizing force of the second return spring 38, whereby the second return spring 38 is brought into contact with the vehicle front side wall of the containment box 36 and the distal end portion of the moving rod 34B of the second link 30 is brought into contact with the second return spring 38, and thus the second link 30 is returned to (stopped in) its initial position.

For this reason, in the present embodiment also, the same action and effects as those of the first embodiment can be provided.

Fourth Embodiment

Figure 9:
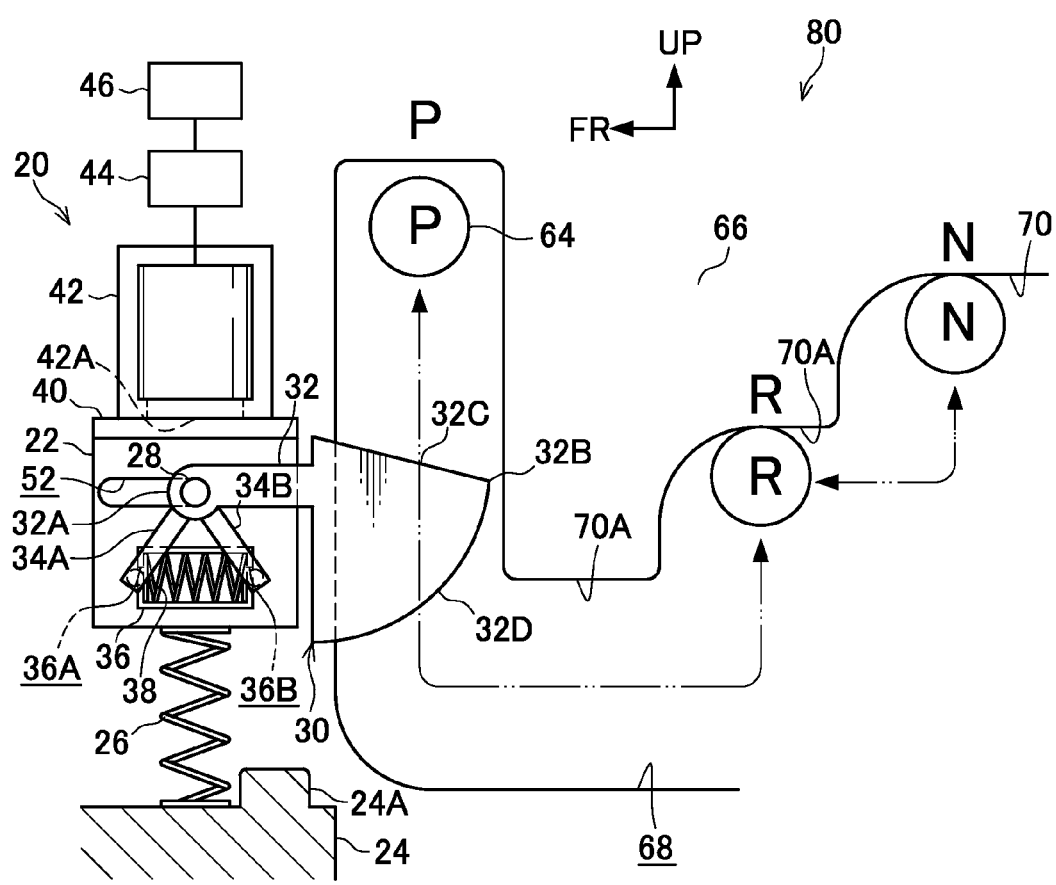
FIG. 9 is a side view showing a shift lock mechanism of a shift lever device pertaining to a fourth embodiment of the present invention as seen from the vehicle left side.

In FIG. 9, main portions of a shift lever device 80 pertaining to a fourth embodiment of the present invention are shown in a side view as seen from the vehicle left side.

The shift lever device 80 pertaining to the present embodiment has substantially the same configuration as that of the shift lever device 60 of the third embodiment but differs in the following respects.

As shown in FIG. 9, in the shift lever device 80 pertaining to the present embodiment, the link hole 52 is applied, like in the second embodiment, to the first link 22 of the shift lock mechanism 20.

The second link 30 is non-rotatably supported on the support shaft 28, and the lock surface 32C of the second link 30 is slanted upward toward the vehicle front.

The stop projection 24A is, like in the second embodiment, integrally formed at the upper surface of the stop wall 24, and the stop projection 24A projects from the stop wall 24 toward the upper side and is placed at the vehicle front side of the distal end portion 32B of the second link 30.

Here, in a case where the magnet 42 does not produce a magnetic force and the yoke plate 40 is not attracted to the attraction surface 42A of the magnet 42 when the lock surface 32C of the second link 30 has been pressed toward the lower side by the grooved pin 64 as a result of the operation button 62 being operated and the grooved pin 64 being moved toward the lower side of the shift lever 18 in a state where the shift lever 18 has been placed in the "P" shift position, the first link 22, the yoke plate 40, and the second link 30 are slid downward counter to the energizing force of the first return spring 26 in a state where sliding of the second link 30 toward the vehicle front side counter to the energizing force of the second return spring 38 has been blocked, whereby the first link 22 is placed in the blocking position and the distal end portion 32B of the second link 30 is stopped by (brought into surface-contact with) the stop wall 24 and the stop projection 24A. Thus, sliding of the second link 30 toward the lower side and the vehicle front side resulting from the pressing force of the shift lever 18 is stopped by the stop wall 24 and the stop projection 24A, and the lock surface 32C of the second link 30 is not slid toward the lower side and the vehicle front side, whereby movement of the grooved pin 64 toward the lower side of the shift lever 18 (operation of the operation button 62) is blocked by the lock surface 32C of the second link 30. For this reason, the grooved pin 64 engages with the detent peak 70A between the "P" position and the "R" position in the detent hole 68, whereby operation of the shift lever 18 from the "P" shift position to the "R" shift position is blocked (locked).

On the other hand, in a case where the magnet 42 produces a magnetic force and the yoke plate 40 is attracted to the attraction surface 42A of the magnet 42 when the lock surface 32C of the second link 30 has been pressed toward the lower side by the grooved pin 64 as a result of the operation button 62 being operated and the grooved pin 64 being moved toward the lower side of the shift lever 18 in a state where the shift lever 18 has been placed in the "P" shift position, the support shaft 28 is slid toward the vehicle front side along the link hole 52 counter to the energizing force of the second return spring 38 in a state where sliding of the first link 22, the yoke plate 40, and the second link 30 downward counter to the energizing force of the first return spring 26 and the force of attraction of the magnet 42 with respect to the yoke plate 40 is blocked, whereby the second link 30 is slid toward the vehicle front side counter to the energizing force of the second return spring 38. For this reason, the lock surface 32C of the second link 30 is slid toward the vehicle front side, whereby movement of the grooved pin 64 toward the lower side of the shift lever 18 (operation of the operation button 62) is allowed. Thus, the grooved pin 64 does not engage with the detent peak 70A between the "P" position and the "R" position in the detent hole 68, whereby operation of the shift lever 18 from the "P" shift position to the "R" shift position is allowed (unlocked).

Further, immediately after the grooved pin 64 has been moved toward the lower side of the shift lever 18 and has crossed over the lock surface 32C of the second link 30, the support shaft 28 is slid toward the vehicle rear side along the link hole 52 by the energizing force of the second return spring 38, and the second link 30 is slid toward the vehicle rear side by the energizing force of the second return spring 38. For this reason, the support shaft 28 is brought into contact with the vehicle rear side end portion of the link hole 52, the second return spring 38 is brought into contact with the vehicle rear side wall of the containment box 36, and the distal end portion of the moving rod 34A of the second link 30 is brought into contact with the second return spring 38, whereby the second link 30 is returned to (stopped in) its initial position.

Moreover, when operation of the operation button 62 is released and the grooved pin 64 is moved toward the upper side of the shift lever 18 after the shift lever 18 has been operated from the "R" shift position to the "P" shift position in a state where the operation button 62 has been operated and the grooved pin 64 has been moved toward the lower side of the shift lever 18, the pressing surface 32D of the second link 30 is pressed toward the upper side by the shift lever 18, whereby the support shaft 28 is slid toward the vehicle front side along the link hole 52 counter to the energizing force of the second return spring 38 and the second link 30 is slid toward the vehicle front side counter to the energizing force of the second return spring 38. For this reason, the distal end portion 32B of the second link 30 is slid toward the vehicle front side, whereby movement of the grooved pin 64 toward the upper side of the shift lever 18 is allowed and movement of the grooved pin 64 to the "P" position in the detent hole 68 is allowed.

Further, immediately after the grooved pin 64 has been moved toward the upper side of the shift lever 18 and has crossed over the distal end portion 32B of the second link 30, the support shaft 28 is slid toward the vehicle rear side along the link hole 52 by the energizing force of the second return spring 38, and the second link 30 is slid toward the vehicle rear side by the energizing force of the second return spring 38. For this reason, the support shaft 28 is brought into contact with the vehicle rear side end portion of the link hole 52, the second return spring 38 is brought into contact with the vehicle rear side wall of the containment box 36, and the distal end portion of the moving rod 34A of the second link 30 is brought into contact with the second return spring 38, whereby the second link 30 is returned to (stopped in) its initial position.

Thus, in the present embodiment also, the same action and effects as those of the third embodiment can be provided.

In the present embodiment, the shift lever device 80 has been given a configuration where the link hole 52 in the first link 22 is placed parallel to the vehicle front-rear direction, but it may also be given a configuration where the link hole 52 in the first link 22 is slanted upward or downward toward the vehicle front. Further, in a case where the shift lever device 80 is given a configuration where the link hole 52 in the first link 22 is slanted downward toward the vehicle front, the lock surface 32C of the second link 30 may be placed perpendicular to the vehicle left-right direction or may be slanted downward toward the vehicle front. Moreover, in a case where the shift lever device 80 is given a configuration where the link hole 52 in the first link 22 is slanted upward toward the vehicle front, the pressing surface 32D of the second link 30 may be placed perpendicular to the up-down direction or may be slanted upward toward the vehicle front.

Further, in the third embodiment and the fourth embodiment, the shift lever devices 60 and 80 have been given a configuration where the shift lock mechanism 20 blocks or allows operation of the shift lever 18 from the "P" shift position to the "R" shift position by blocking or allowing movement of the grooved pin 64, but they may also be given a configuration where, like in the first embodiment and the second embodiment, the shift lock mechanism 20 blocks or allows operation of the shift lever 18 from the "P" shift position to the "R" shift position by blocking or allowing movement of the shift lever 18.

Fifth Embodiment

Figure 10:
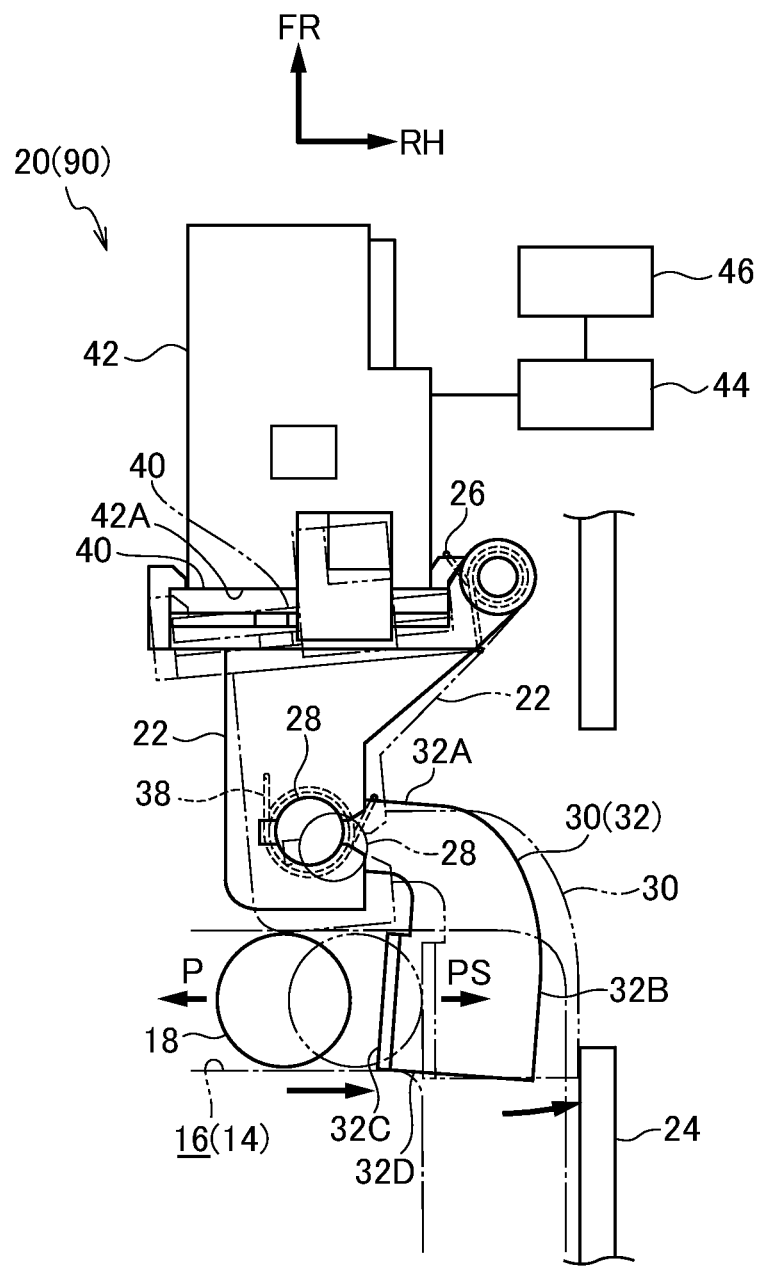
FIG. 10 is a plan view showing a shift lock mechanism of a shift lever device pertaining to a fifth embodiment of the present invention as seen from above at a time of shift lock.

In FIG. 10, a shift lever device 90 pertaining to a fifth embodiment of the present invention is shown in a plan view as seen from above.

The shift lever device 90 pertaining to the present embodiment has substantially the same configuration as that of the shift lever device 10 of the first embodiment but differs in the following respects.

As shown in FIG. 10, in the shift lever device 90 pertaining to the present embodiment, the first link 22 is rotatably supported at its end portion on the vehicle front side and the vehicle right side in the shift lock mechanism 20, and the first link 22 is rotatable in the vehicle left-right direction between an allowing position that is its initial position (a lock-release position indicated by the solid lines in FIG. 10) and a blocking position (a lock position indicated by the double dashed chain lines in FIG. 10).

The first return spring 26 is disposed on a rotating shaft of the first link 22, and the first return spring 26 is configured by a torsion coil spring and energizes the first link 22 toward the vehicle left side.

The yoke plate 40 is held on the vehicle front side surface of the first link 22, and the yoke plate 40 is rotatable integrally with the first link 22.

The magnet 42 is fixed on the vehicle front side of the yoke plate 40, and the attraction surface 42A is disposed on the vehicle rear side surface of the magnet 42. The yoke plate 40 is brought into surface-contact with the attraction surface 42A by the energizing force of the first return spring 26; thus, the first link 22 is stopped in the allowing position that is its initial position. Further, the yoke plate 40 is separable from the magnet 42 (the attraction surface 42A) as a result of the first link 22 and the yoke plate 40 being rotated toward the vehicle right side counter to the energizing force of the first return spring 26.

The support shaft 28 of the first link 22 is disposed projecting downward from the first link 22. Further, the containment box 36 is not disposed on the first link 22, and the moving rods 34A and 34B are not disposed on the second link 30.

The second return spring 38 is disposed on the support shaft 28 of the first link 22, and the second return spring 38 is configured by a torsion coil spring and is disposed bridging the distance between the first link 22 and the second link 30. The second return spring 38 energizes the second link 30 toward the vehicle left side, rotation of the second link 30 is stopped (restricted) by the first link 22, and the second link 30 is placed in its initial position.

The vehicle rear side surface of the distal end portion 32B of the second link 30 (the link body 32) is configured by the pressing surface 32D, and the pressing surface 32D is placed substantially perpendicular to the vehicle front-rear direction. When the shift lever 18 is operated from the "R" shift position and reaches the "PS" position, the pressing surface 32D of the second link 30 is pressed toward the vehicle front side by the shift lever 18.

The stop wall 24 (a plate) is fixed on the vehicle right side of the vehicle rear side end portion of the second link 30, and the vehicle left side surface of the stop wall 24 is placed perpendicular to the vehicle left-right direction. Further, the stop wall 24 is not placed at the vehicle right side of the portion of the second link 30 other than the vehicle rear side end portion.

In a state where the brakes 46 are not operated, an electric current is not passed through the magnet 42 by the control of the control device 44, whereby a magnetic force does not arise in the attraction surface 42A and the yoke plate 40 is not attracted to the attraction surface 42A. Thus, rotation of the yoke plate 40 and the first link 22 toward the vehicle right side (the blocking direction) is allowed, whereby the first link 22 is rotatable from the allowing position to the blocking position and is placed in the blocking state (the lock state).

On the other hand, in a state where the brakes 46 have been operated, an electric current is passed through the magnet 42 by the control of the control device 44, whereby a magnetic force arises in the attraction surface 42A and the yoke plate 40 is attracted to (held on) the attraction surface 42A. Thus, rotation of the yoke plate 40 and the first link 22 toward the vehicle right side is blocked by the magnet 42, whereby the first link 22 is held in the allowing position and is placed in the allowing state (the lock-release state).

Here, in a case where the magnet 42 does not produce a magnetic force and the yoke plate 40 is not attracted to the attraction surface 42A of the magnet 42 when the shift lever 18 is operated from the "P" shift position and reaches the "PS" position, as indicated by the double dashed chain lines in FIG. 10, the first link 22, the yoke plate 40, and the second link 30 are rotated toward the vehicle right side counter to the energizing force of the first return spring 26 in a state where rotation of the second link 30 with respect to the first link 22 counter to the energizing force of the second return spring 38 is blocked, whereby the first link 22 is placed in the blocking position and the second link 30 is stopped by the stop wall 24. Thus, rotation of the second link 30 resulting from the pressing force of the shift lever 18 is stopped by the stop wall 24, and the lock surface 32C of the second link 30 is not rotated toward the vehicle right side and the vehicle front side, whereby operation of the shift lever 18 to the "PS" position is blocked by the lock surface 32C of the second link 30 and operation of the shift lever 18 from the "P" shift position to the "R" shift position is blocked.

Thereafter, when the shift lever 18 is operated (returned) to the "P" shift position, the first link 22, the yoke plate 40, and the second link 30 are rotated toward the vehicle left side by the energizing force of the first return spring 26 and are returned to (stopped in) their initial position as a result of the yoke plate 40 being brought into contact with the magnet 42 (the attraction surface 42A).

Figure 11:
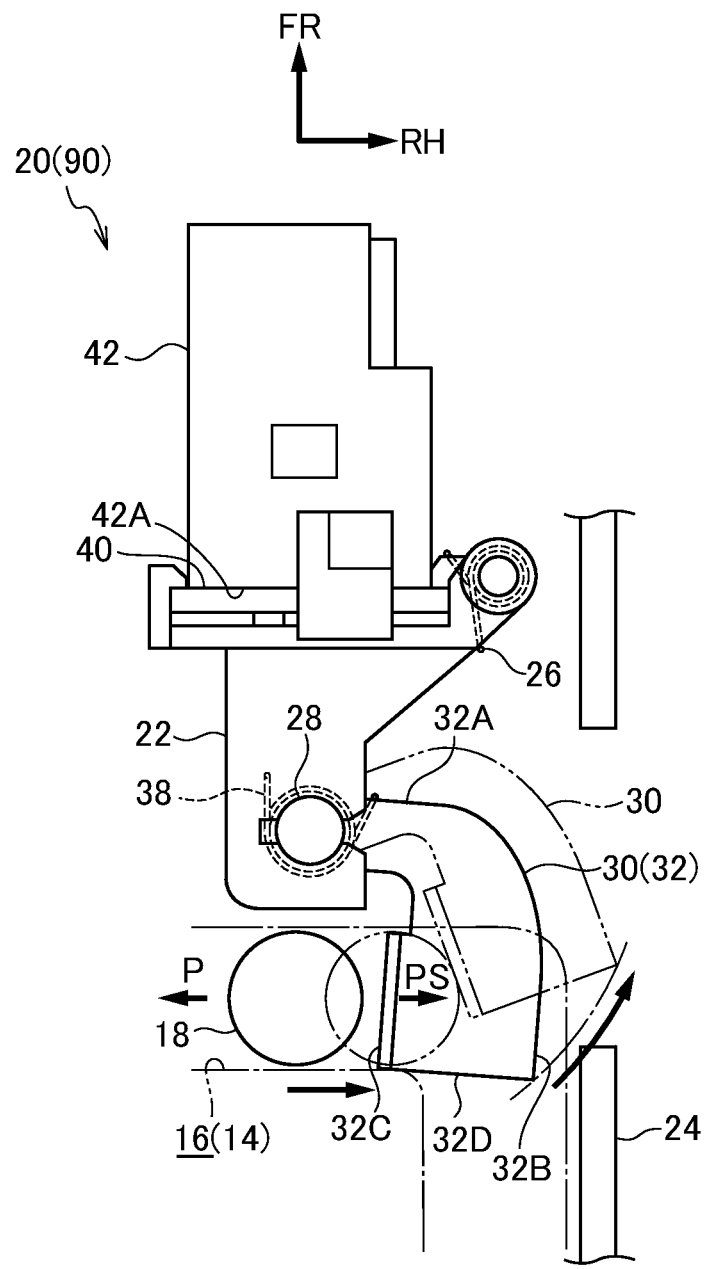
FIG. 11 is a plan view showing the shift lock mechanism of the shift lever device pertaining to the fifth embodiment of the present invention as seen from above at a time of shift lock release.

On the other hand, in a case where the magnet 42 produces a magnetic force and the yoke plate 40 is attracted to the attraction surface 42A of the magnet 42 when the shift lever 18 is operated from the "P" shift position and reaches the "PS" position, as indicated by the double dashed chain lines in FIG. 11, the second link 30 is rotated counter to the energizing force of the second return spring 38 in a state where rotation of the first link 22, the yoke plate 40, and the second link 30 toward the vehicle right side counter to the energizing force of the first return spring 26 and the force of attraction of the magnet 42 with respect to the yoke plate 40 is blocked, whereby the second link 30 is not stopped by the stop wall 24. Thus, the lock surface 32C of the second link 30 is rotated toward the vehicle right side and the vehicle front side, whereby operation of the shift lever 18 to the "PS" position is allowed and operation of the shift lever 18 from the "P" shift position" to the "R" shift position is allowed.

Further, immediately after the shift lever 18 has passed the "PS" position, the second link 30 is rotated by the energizing force of the second return spring 38 and is stopped by the first link 22, whereby the second link 30 is returned to its initial position.

Figure 12:
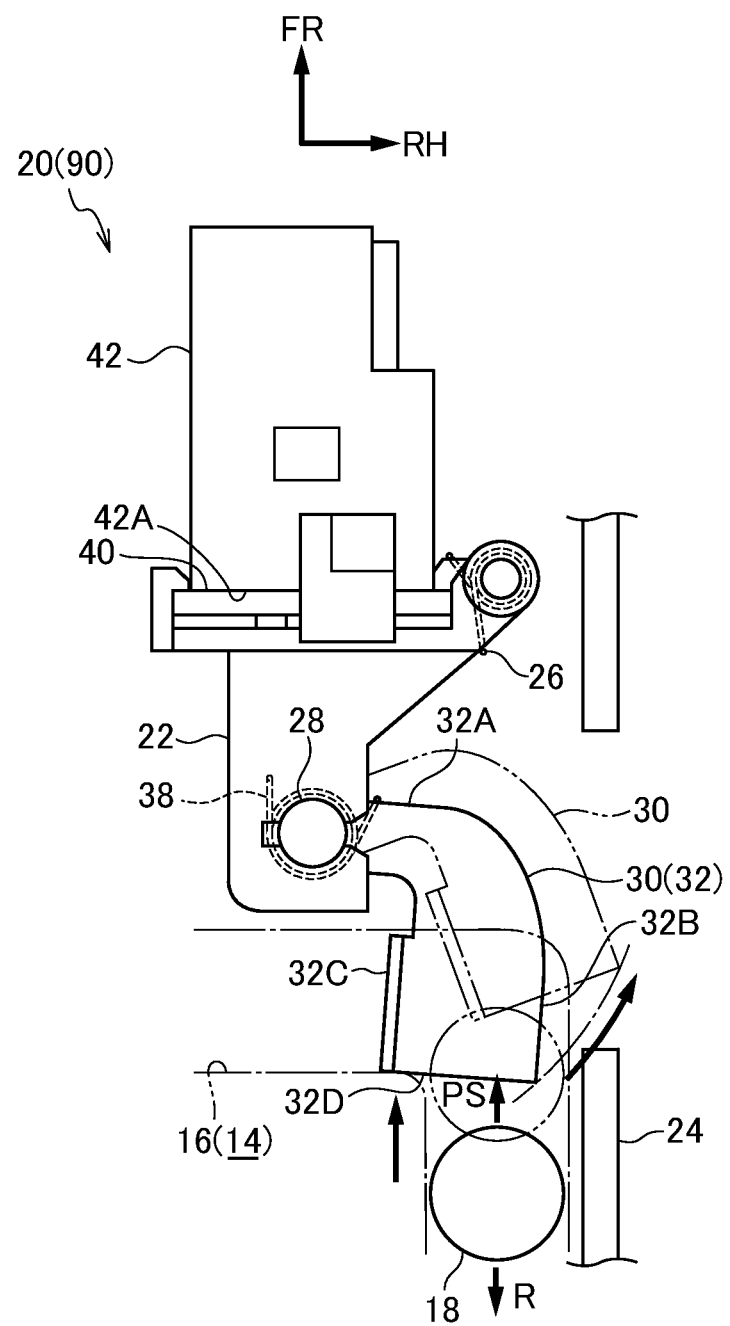
FIG. 12 is a plan view showing the shift lock mechanism of the shift lever device pertaining to the fifth embodiment of the present invention as seen from above at a time when a shift lever is operated to a "P" shift position.

When the shift lever 18 is operated from the "R" shift position and reaches the "PS" position, as indicated by the double dashed chain lines in FIG. 12, the pressing surface 32D of the second link 30 is pressed toward the vehicle front side by the shift lever 18, whereby the second link 30 is rotated counter to the energizing force of the second return spring 38 in a state where the first link 22 is acted upon by a force of rotation from the second link 30 toward the vehicle left side and is not rotated (a state where the first link 22 has been placed in the allowing position), and the second link 30 is not stopped by the stop wall 24. Thus, the distal end portion 32B of the second link 30 is rotated toward the vehicle right side and the vehicle front side, whereby operation of the shift lever 18 to the "PS" position is allowed and operation of the shift lever 18 from the "R" shift position to the "P" shift position is allowed.

Further, immediately after the shift lever 18 has passed the "PS" position, the second link 30 is rotated by the energizing force of the second return spring 30 and is stopped by the first link 22, whereby the second link 30 is returned to its initial position.

As described above, in the present embodiment also, the same action and effects as those of the first embodiment can be provided.

In the present embodiment, the shift lever device 90 has been given a configuration where the shift lock mechanism 20 is applied to the gate shift lever device 10, but it may also be given a configuration where the shift lock mechanism 20 is applied to the straight shift lever devices 60 and 80 in the third embodiment and the fourth embodiment.

In this case, it is preferable to be configured such that the lock surface 32C of the second link 30 is faced under the "P" position in the detent hole 68, and such that the grooved pin 64 presses the pressing surface 32D of the second link 30 toward the vehicle front side when the shift lever 18 is operated from the "R" shift position to the "P" shift position in a state where the operation button 62 has been operated and the grooved pin 64 has been moved toward the lower side of the shift lever 18.

Moreover, in the first embodiment to the fifth embodiment, the shift lever device may also be given a configuration where the distal end portion 32B of the second link 30 is rotatably connected with respect to the proximal end portion 32A side of the second link 30. In this case, the distal end portion 32B is energized with respect to the proximal end portion 32A side, whereby rotation of the distal end portion 32B toward the side opposite to the "P" shift position side of the operation groove 16 or the side opposite to the "P" position side of the detent hole 68 with respect to the proximal end portion 32A side is stopped and rotation of the distal end portion 32B side counter to an energizing force toward the "P" shift position side of the operation groove 16 or the "P" position side of the detent hole 68 with respect to the proximal end portion 32A side is allowed.

Thus, the second link 30 blocks or allows operation of the shift lever 18 from the "P" shift position to the "R" shift position or movement of the grooved pin 64 from the "P" position in the detent hole 68 in a state where rotation of the distal end portion 32B toward the side opposite to the "P" shift position side of the operation groove 16 or the side opposite to the "P" position side of the detent hole 68 with respect to the proximal end portion 32A side is stopped. On the other hand, the second link 30 allows operation of the shift lever 18 from the "R" shift position to the "P" shift position or movement of the grooved pin 64 to the "P" position in the detent hole 68 as a result of the distal end portion 32B being rotated toward the "P" shift position side of the operation groove 16 or the "P" position side of the detent hole 68 counter to an energizing force with respect to the proximal end portion 32A side.

Moreover, in the first embodiment to the fifth embodiment, the shift lever devices 10, 50, 60, 80, and 90 have been given a configuration where they are floor shift lever devices and installed on the floor portion of the cabin, but the shift lever devices 10, 50, 60, 80, and 90 may also be given a configuration where they are installed in a steering column of the vehicle or a configuration where they are installed in an instrument panel of the vehicle.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A shift lever device comprising:
 a shift lever whose shift position is changed as a result of the shift lever being operated;
 a placement member that is movable between a blocking position and an allowing position and that is placed in the blocking position or the allowing position when the shift lever is operated from a predetermined shift position;
 a moving member that is movable with respect to the placement member, that blocks operation of the shift lever from the predetermined shift position as a result of the placement member being placed in the blocking position when the shift lever is operated from the predetermined shift position, and that allows operation of the shift lever from the predetermined shift position as a result of the placement member being placed in the allowing position when the shift lever is operated from the predetermined shift position; and an attraction unit that is capable of attracting the placement member, with the placement member being separable therefrom, and that switches the placement of the placement member in the blocking position and the allowing position when the shift lever is operated from the predetermined shift position, as a result of attraction and non-attraction with respect to the placement member being switched, wherein the attraction unit is immovable both within the shift lever device and with respect to the placement member.

2. The shift lever device according to claim 1, further comprising a first energizing member that energizes the placement member toward an initial position side.

3. A shift lever device comprising:
a shift lever whose shift position is changed as a result of the shift lever being operated;
a placement member that is movable between a blocking position and an allowing position and that is placed in the blocking position or the allowing position when the shift lever is operated from a predetermined shift position;
a moving member that is movable with respect to the placement member as a result of a user's force operating the shift lever in a blocking direction and an allowing direction, that blocks operation of the shift lever from a predetermined shift position as a result of the placement member being moved in the blocking direction when the shift lever is operated from the predetermined shift position, and that allows operation of the shift lever from the predetermined shift position as a result of the placement member being moved in the allowing direction when the shift lever is operated from the predetermined shift position; and
an attraction unit that switches the direction in which the moving member is moved, when the shift lever is operated from the predetermined shift position, between the blocking direction and the allowing direction, and that is capable of attracting the placement member, with the placement member being separable therefrom, and that switches the placement of the placement member in the blocking position and the allowing position when the shift lever is operated from the predetermined shift position, as a result of attraction and non-attraction with respect to the placement member being switched, wherein the attraction unit is immovable both within the shift lever device and with respect to the placement member.

4. The shift lever device according to claim 3, further comprising a first energizing member that energizes the moving member toward an initial position side.

5. The shift lever device according to claim 3, wherein one of the blocking direction and the allowing direction is a sliding direction, or a sliding direction and a rotating direction, and the other of the blocking direction and the allowing direction is only a rotating direction.

\* \* \* \* \*